(12) United States Patent
Miura (10) Patent No.: US 6,407,606 B1
(45) Date of Patent: Jun. 18, 2002

(54) CLOCK GENERATING APPARATUS

(75) Inventor: Kiyoshi Miura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/714,538

(22) Filed: Nov. 17, 2000

(30) Foreign Application Priority Data

Nov. 19, 1999 (JP) .......................................... 11-329454

(51) Int. Cl.[7] .............................................. H03H 11/16
(52) U.S. Cl. ....................................... 327/241; 327/295
(58) Field of Search ................................ 327/295, 296, 327/297, 298, 299, 231, 239, 241, 245, 247, 249, 251, 253

(56) References Cited

U.S. PATENT DOCUMENTS 4,283,783 A * 8/1981 Nakajima et al. ............. 368/76
5,243,227 A * 9/1993 Gutierrez, Jr. et al. ....... 327/277
5,298,870 A * 3/1994 Cytera et al. .................. 331/45
5,917,850 A * 6/1999 Fujita et al. ................. 375/150

* cited by examiner

Primary Examiner—Toan Tran
Assistant Examiner—Cassandra Cox
(74) Attorney, Agent, or Firm—Ronald P. Kananen, Esq.; Rader, Fishman & Grauer, PLLC

(57) ABSTRACT

A clock forming unit, a selection processing unit, and a dithering control unit are provided. In the clock forming unit, m-phase clock signals whose phases are mutually deviated by a predetermined amount at a desired frequency are formed. The clock signals formed in the clock forming unit are supplied to the selection processing unit. A control signal is supplied from the dithering control unit to the selection processing unit. In the selection processing unit, by sequentially selecting one of the m-phase clock signals in response to the control signal from the dithering control unit, the phase is fluctuated forward and backward with a predetermined relation within a range of a precision that is permitted by a communication system serving as a supplying destination. A second clock signal in which a peak on a spectrum is spread is obtained from the selection processing unit.

22 Claims, 11 Drawing Sheets

CLOCK GENERATING APPARATUS

BACKGROUND OF THE INVENTION

1. Field of the Invention

The invention relates to a clock generating apparatus suitable for use in electronic equipment having a communicating function based on, for example, an IEEE1394 serial interface system or the like.

2. Description of the Related Art

At present, a serial interface system called IEEE1394 has been proposed as a peripheral interface of the next generation for coupling a personal computer and each commercially available equipment in correspondence to the realization of multimedia. An application to a video camera, a printer, a musical instrument, a system such as LAN in a home, or the like is being progressed by using the interface system.

In the commercially available equipment or the like, a problem of electromagnetic noises is restricted by each safety reference. In digital equipment it which a high processing speed has been realized, therefore, a spread spectrum clock is used as a method of reducing the electromagnetic noises. Specifically speaking, a jitter is generated by purposely adding noises lest a peak of a spectrum is generated at a specific frequency, or a frequency is gently fluctuated at such a frequency that no influence is exerted on the operation of a circuit, for example, at a frequency in a range from several kHz to several 100 kHz.

In a serial communication using the IEEE1394 or the like, however, in an LSI chip of a physical layer which actually handles serial communication on a cable, a precision in a range from about 50 ppmw to about 100 ppm is usually required as a frequency precision for guaranteeing the communication, so that a clock frequency cannot be gently fluctuated.

Figure 1:
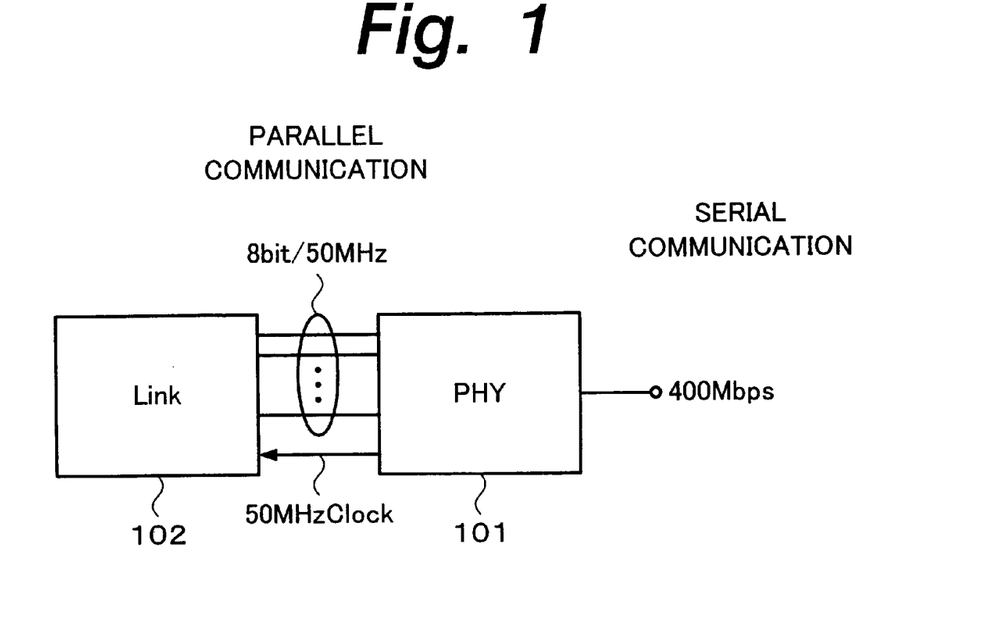
FIG. 1 is a conceptual diagram for use in explanation of a conventional clock generating apparatus.

FIG. 1 shows an example of a construction of a serial communication system. As shown in FIG. 1, an LSI chip 101 of a physical layer exists between an LSI chip 102 as a link layer and a transmission line as a physical medium. The LSI chip 101 executes transmission and reception of packet data in parallel to the LSI chip 102 of the link layer on the basis of the frequency obtained by frequency dividing a clock for serial communication. Specifically speaking, in case of IEEE1394, parallel data of maximum 8 bits at 50 MHz is transmitted at a CMOS level (3V or 5V). On the transmission line side of the LSI chip 101, serial communication is performed at a rate of 400 Mbps through a terminal 103.

As mentioned above, on the parallel communication side, since an amplitude-is large and the frequency is high, it is necessary to at least take into consideration the electromagnetic noises by paying attention to this portion. That is, conditions such that while supplying a high precision clock to the serial communication side, on the parallel communication side, the spread spectrum clock is used and a clock synchronized with the clock on the serial communication side can be supplied are necessary in a chip for performing both serial communication and parallel communication. Although the use of a conventional forming circuit of the spread spectrum clock is considered to meet such a requirement, in this case, since it is necessary to change the frequency of the clock by an amount that is equal to or larger than about a few % of the ordinary frequency, it is difficult to use such a forming circuit for the chip for performing both serial communication and parallel communication.

Although a method of fluctuating only a phase without varying a frequency by a DLL (Delay-Locked Loop) has been proposed, also in this case, since an analog circuit is used, not only it is difficult to design but also there is a problem in terms of an increase in circuit area and a processing portability.

OBJECT AND SUMMARY OF THE INVENTION

It is, therefore, an object of the invention to provide a clock generating apparatus in which a synchronized spread spectrum clock in a predetermined phase difference can be formed by a simple construction and which can be used for a chip for performing both serial communication and parallel communication.

To solve the above problem, according to the invention, there is provided a clock generating apparatus in a communication system for performing data communication between electronic equipment connected by a bus, comprising: clock forming means for forming clock signals of m (m: natural number of 2 or more) phases mutually having a phase difference; selecting means for sequentially selecting one of the clock signals of m phases which are supplied from the clock forming means and outputting it as a second clock signal; and control means for supplying a control signal to the selecting means and controlling so that a spectrum of the second clock signal obtained from the selecting means is spread.

According to the invention, the clock forming means, selecting means, and control means are provided. In the clock forming means, the m-phase clock signals whose phases are mutually deviated by a predetermined amount at a desired frequency are formed, and the clock signals of m phases formed by the clock forming means are supplied to the selecting means. The control signal is supplied from the control means to the selecting means. One of the clock signals of m phases is sequentially selected by the selecting means in response to the-control signal from the control means. Thus, the phase fluctuates forward and backward with a predetermined relation within a range of a precision permitted by a communication system as a supplying destination. The second clock signal in which the peak on the spectrum is spread is outputted from the selecting means.

The above and other objects and features of the present invention will become apparent from the following detailed description and the appended claims with reference to the accompanying drawings.

DETAILED DESCRIPTION OF THE PREFERRED EMBODIMENT

Figure 2:
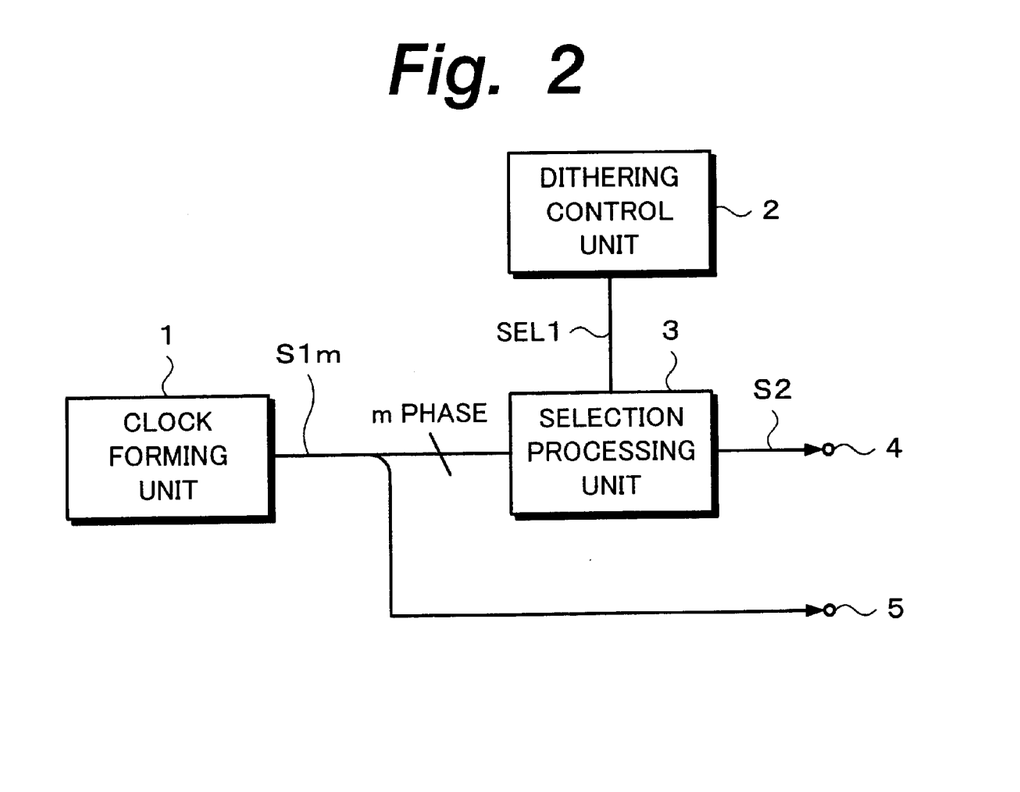
FIG. 2 is a block diagram showing a whole construction of an embodiment of the invention.

An embodiment of the invention will now be described hereinbelow with reference to the drawings. FIG. 2 shows a whole construction of the embodiment of the invention. As shown in FIG. 2, a clock generating apparatus according to the invention is constructed by a clock forming unit 1, a dithering control unit 2, and a selection processing unit 3.

The clock forming unit 1 has a PLL circuit, a quartz oscillator, a multiplexing/frequency dividing circuit, and the like and forms m-phase clock signals whose phases are mutually deviated by a predetermined amount at a desired frequency. Clock signals S1m of m phases formed in the clock forming unit 1 are supplied to the selection processing unit 3 and taken out through an output terminal 5. The clock signals S1m of m phases taken out from the output terminal 5 are supplied to, for example, a circuit portion of a serial communication system (not shown) in which a jitter is as small as possible and a high precision is required and are used.

Figure 3:
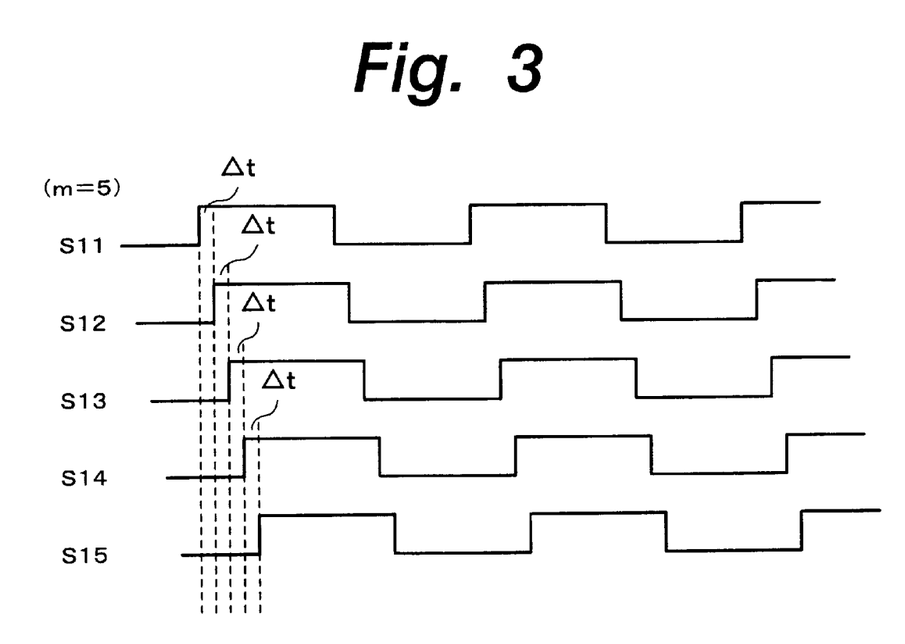
FIG. 3 is a waveform diagram for use in explanation of the embodiment of the invention.

FIG. 3 shows an example of clock signals S11 to S15 which are formed in the clock forming unit 1 in the case where (m=5). As shown in FIG. 3, the 5-phase clock signals S11 to S15 whose phases are mutually deviated by Δt at a desired frequency are formed in the clock forming unit 1.

A control signal SEL1 is supplied from the dithering control unit 2 to the selection processing unit 3. The selection processing unit 3 sequentially selects one of the clock signals S1m of m phases in response to the control signal SEL1 and outputs as a clock signal S2 for the parallel communication system. The clock signal S2 selected in the selection processing unit 3 is taken out through an output terminal 4, supplied to, for example, a circuit portion of the parallel communication system (not shown), and used.

The dithering control unit 2 to control the selection processing unit 3 forms the selection signal SEL1 so that a spectrum of the clock signal S2 obtained at the output terminal 4 is spread as wide as possible and the phase fluctuates forward and backward with a predetermined relation within a range of a precision permitted by the parallel communication system as a supplying destination. The "dithering" used in the description of the embodiment of the invention does not indicate a process for adding noises for making quantization noises auditorily inconspicuous but denotes a process for purposely fluctuating the phase forward and backward with a predetermined relation, adding a jitter, and spreading the peak on the spectrum.

Figure 4:
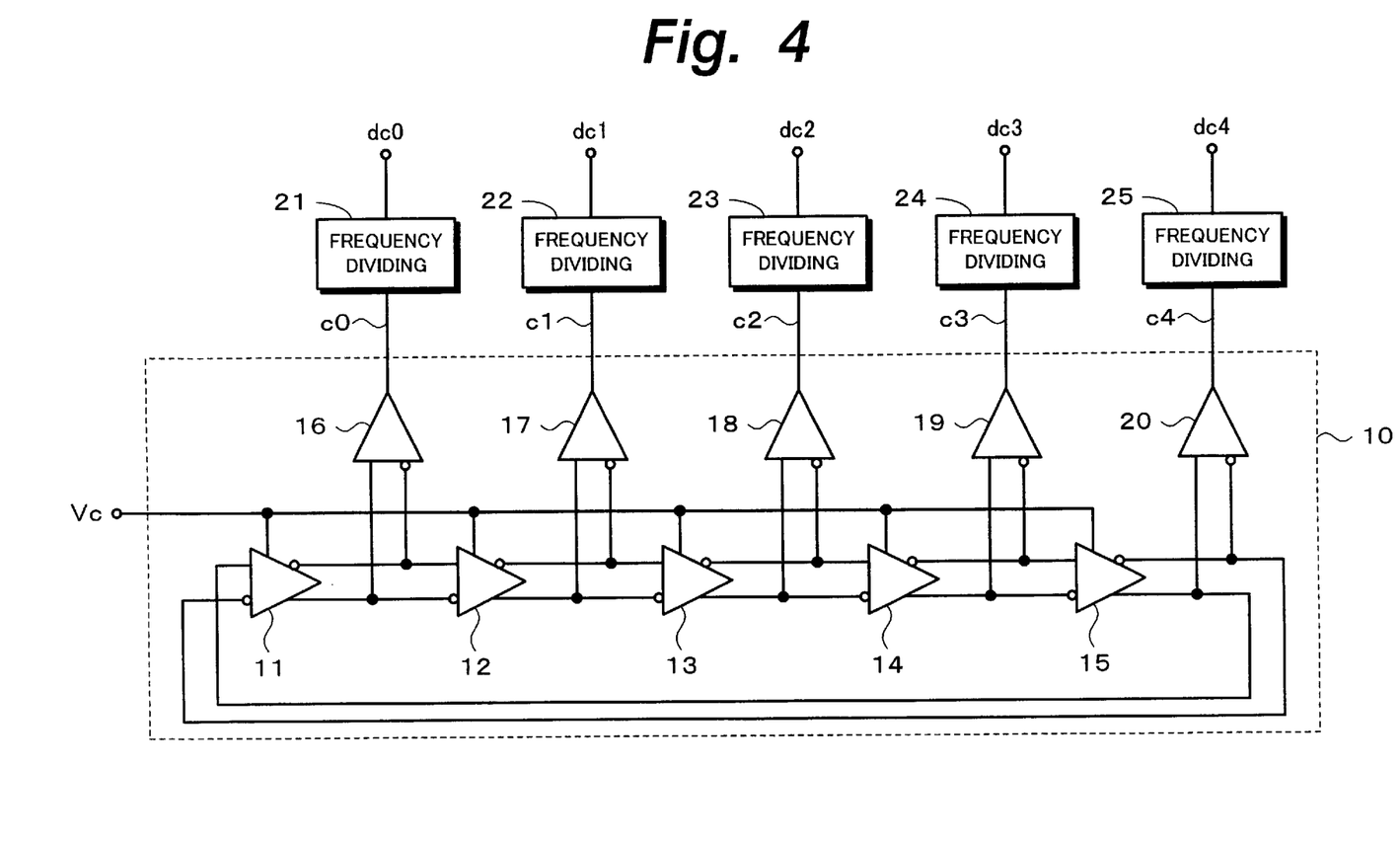
FIG. 4 is a block diagram showing an example of a clock forming unit in the embodiment of the invention.

A construction of each portion in the embodiment will be further described in detail by setting (m=5) for convenience of explanation. FIG. 4 shows an example of a specific construction of the clock forming unit 1. In FIG. 4, reference numeral 10 denotes a ring oscillator with a 5-stage construction. As shown in FIG. 4, the ring oscillator 10 with the 5-stage construction is constructed by five delay circuits 11 to 15 and five buffers 16 to 20.

An inversion output terminal of the delay circuit 11 and an input terminal of the delay circuit 12 are connected. An output terminal of the delay circuit 11 and an inversion input terminal of the delay circuit 12 are connected. Similarly, an inversion output terminal and an input terminal of the adjacent delay circuits are connected and an output terminal and an inversion input terminal of the adjacent delay circuits are connected. That is, the delay circuits 11 to 15 are connected so as to serially form a ring-shape. An inversion input terminal of the buffer 16 is connected to a node of the inversion output terminal of the delay circuit 11 and the input terminal of the delay circuit 12. An input terminal of the buffer 16 is connected to a node of the output terminal of the delay circuit 11 and the inversion input terminal of the delay circuit 12. Similarly, an inversion input terminal and an input terminal of each of the buffers 17 to 20 are connected to a node of the inversion output terminal and the input terminal of the adjacent circuits and a node of the output terminal and the inversion input terminal of the adjacent circuits, respectively. A power voltage is supplied to each of the delay circuits 11 to 15 through a power terminal Vc.

Figure 5A:
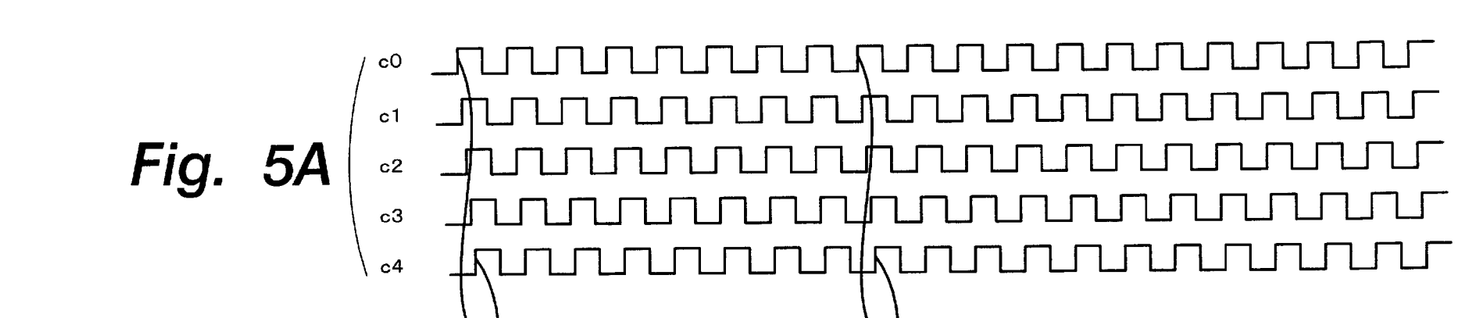
FIGS. 5A and 5B are waveform diagrams for use in explanation of the clock forming unit in the embodiment of the invention.

FIG. 5A shows signals c0 to c4 which are obtained from the buffers 16 to 20, respectively. As shown in FIG. 5A, the 5-phase signals c0 to c4 whose phases are mutually deviated by a predetermined amount are obtained from the buffers 16 to 20. For example, in the LSI chip of the physical layer of IEEE1394, since a clock signal of 400 MHz is needed, explanation will be made on the assumption that the invention is applied to IEEE1394. In this case, the five signals c0 to c4 of 400 MHz whose phases are mutually deviated with a phase difference of 250 psec are outputted from the ring oscillator 10 with the 5-stage construction. Although the case of obtaining the dithered signal from the output terminal 4 and obtaining the signal before the dithering process from the output terminal 5 has been described in FIG. 2, in case of applying the invention to the LSI chip of the physical layer of IEEE1394, the clock signal whose frequency is 8 times as high as that of the output terminal 4 is actually outputted from the output terminal 5. Therefore, for example, one of the signals c0 to c4 is taken out from the output terminal 5.

Figure 5B:
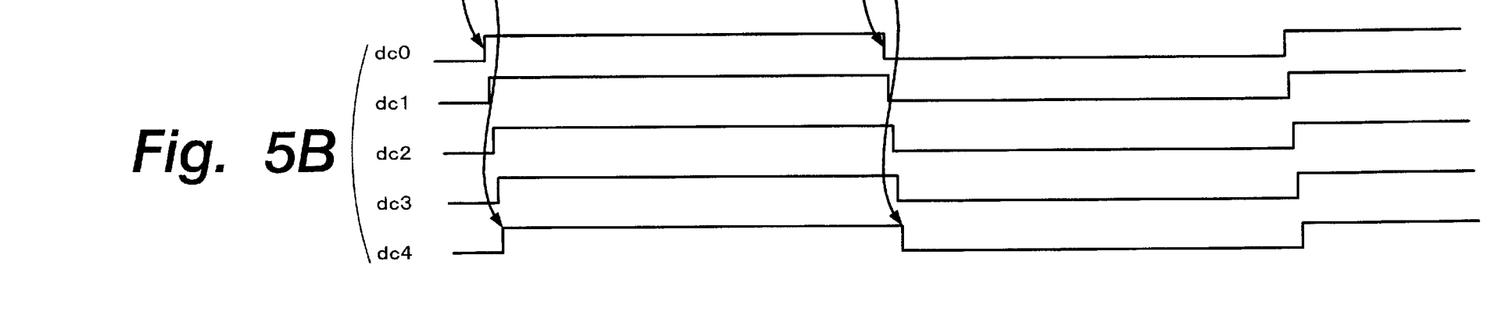

The signals c0 to c4 which are outputted from the buffers 16 to 20 are supplied to ⅟16-frequency dividing circuits 21 to 25 provided in correspondence to the buffers 16 to 20 and frequency divided into ⅟16, so that five signals dc0 to dc4 of 50 MHz whose phases are mutually deviated with a phase difference of 250 psec are formed as shown in FIG. 5B. The signals dc0 to dc4 are supplied to the selection processing unit 3.

Figure 6:
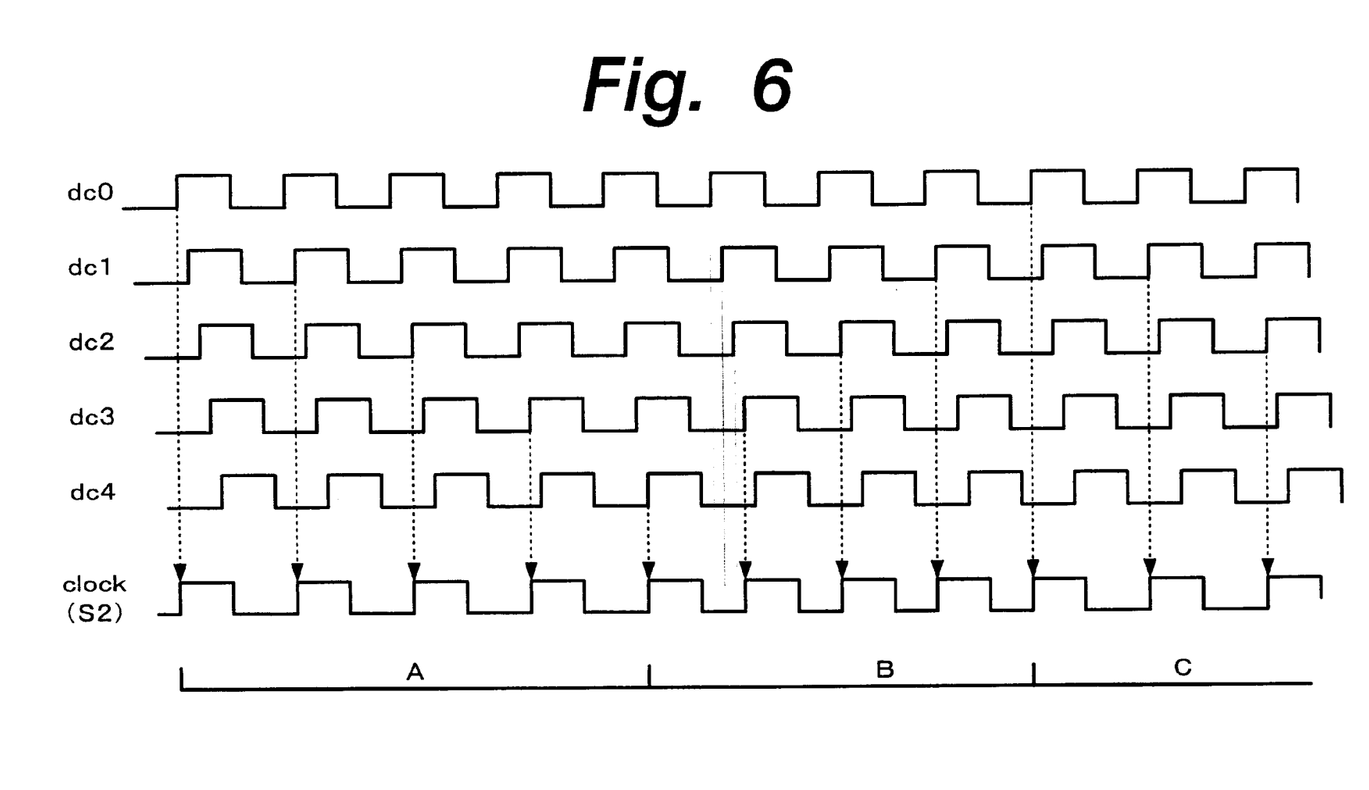
FIG. 6 is a waveform diagram for use in explanation of a selection processing unit in the embodiment of the invention.

FIG. 6 shows an example of the clock signal S2 which is formed in the selection processing unit 3. As mentioned above, the selection processing unit 3 is controlled by the selection signal SEL1 from the dithering control unit 2 and sequentially selects one of the signals dc0 to dc4 every cycle as shown in FIG. 6. FIG. 6 shows a state where two periods of 20.25 nsec and 19.75 nsec in which a period 20 nsec of 50 MHz is set to a reference are alternately selected and one clock signal S2 is synthesized. A relation between the selected waveform and the clock signal S2 is shown by an arrow of a broken line.

Specifically speaking, in a period A, the phase is delayed every cycle by 250 psec at a time. In a period B, on the contrary, the phase is advanced every cycle by 250 psec at a time. In a period C, the phase is delayed again by 250 psec at a time in a manner similar to the case of the period A. By performing the selecting process as mentioned above, in the period A, the frequency of the clock signal S2 is equal to (1/20.25 nsec=49.38 MHz). In the period B, it is equal to (1/19.75 nsec=50.63 MHz). In the whole interval where the clock signal S2 is at the high level, it is fixed to 20 nsec. Therefore, a certain amount of component of 50 MHz is also contained in the clock signal S2. The dithered clock signal S2 includes three components of (49.38, 50, 50.63) as fundamental frequencies, the spectrum is spread, and the peak value is suppressed to a low value.

The frequency corresponding to the periods A and B is equal to 50/8=6.25 MHz at 50 MHz and in the 8-cycle period. Generally, a band width of a PLL circuit which is used for the clock synchronization is narrower than the dither frequency at which the phase is fluctuated forward and backward and does not follow it. That is, in the PLL circuit, the phase is locked to the average phase, the phase difference by the dithering in each cycle is regarded as a jitter to the end and the parallel communication with the chip to be synchronized by using the PLL circuit is executed without a trouble.

Figure 7A:
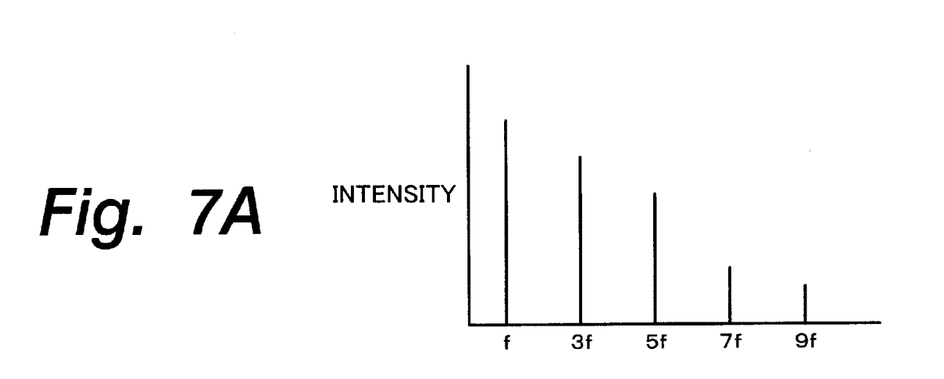
FIGS. 7A and 7B are characteristics diagrams for use in explanation of the selection processing unit in the embodiment of the invention.
Figure 7B:
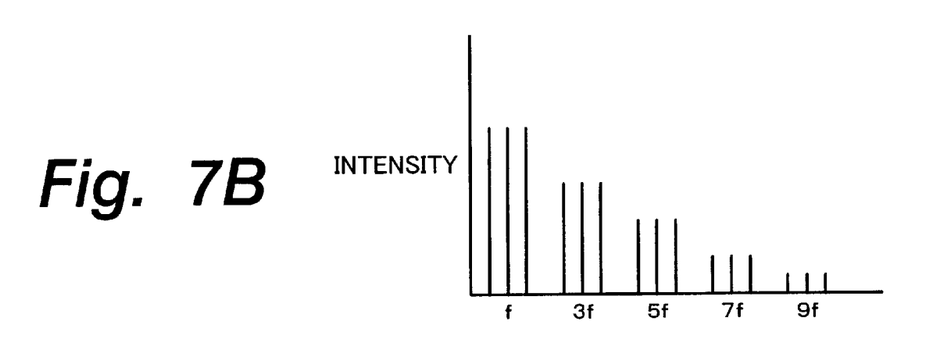

FIG. 7A shows a frequency distribution of one of the signals dc0 to dc4 in the case where the dither process is not performed. In FIG. 7A, an axis of abscissa indicates a frequency and an axis of ordinate indicates an intensity of the spectrum. As shown in FIG. 7A, peaks appear at the fundamental frequency of 50 MHz and the frequencies which are odd-number times as high as the fundamental frequency. FIG. 7B shows a frequency distribution of the clock signal S2 synthesized by dithering. Also in FIG. 7B, an axis of abscissa indicates a frequency and an axis of ordinate shows an intensity of the spectrum. As shown in FIG. 7B, the clock signal S2 synthesized by dithering includes three components of (49.38, 50, 50.63) as fundamental frequencies, the spectrum is spread, and the peak value is suppressed to a low value. As mentioned above, according to the invention, by purposely fluctuating the phase forward and backward with a predetermined relation and adding the jitter, the peak on the spectrum is spread. At this time, the jitter itself is up to about ±500 psec in case of the foregoing example. This value is equal to at most 2.5% of the clock period of 20 nsec and is at a level which does not cause a problem on the operation guarantee in the parallel communication system.

Figure 8:
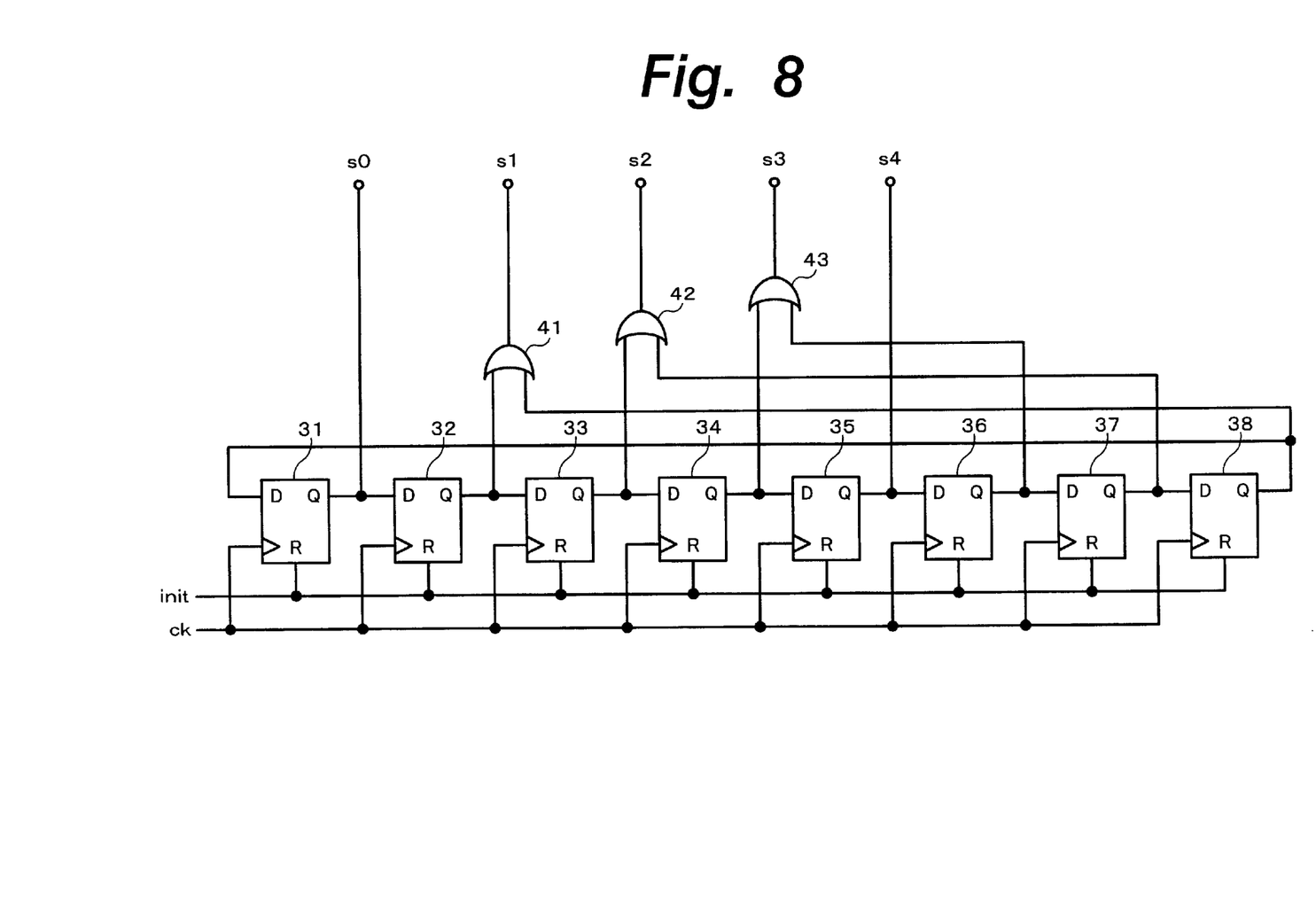
FIG. 8 is a block diagram showing an example of a dithering control unit in the embodiment of the invention.

FIG. 8 shows an example of a specific construction of the dithering control unit 2. As shown in FIG. 8, the dithering control unit 2 is constructed by eight D-type flip-flops 31 to 38 and three OR circuits 41, 42, and 43. The control signal can be also similarly formed by using a state machine circuit without forming the construction using the shift registers as shown in FIGS. 7A and 7B.

An output terminal Q of the flip-flop 31 and an input terminal D of the flip-flop 32 are connected. Similarly, an output terminal Q and an input terminal D of the adjacent flip-flops are connected. That is, the flop-flops 31 to 38 are connected so,as to serially form a ring-shape. One input terminal of the OR circuit 41 is connected to a node of the output terminal Q of the flop-flop 32 and the input terminal D of the flip-flop 33. Another input terminal of the OR circuit 41 is connected to a node of the output terminal Q of the flip-flop 38 and the input terminal D of the flip-flop 31. One input terminal of the OR circuit 42 is connected to a node of the output terminal Q of the flop-flop 33 and the input terminal D of the flip-flop 34. Another input terminal of the OR circuit 42 is connected to a node of the output terminal Q of the flip-flop 37 and the input terminal D of the flip-flop 38. One input terminal of the OR circuit 43 is connected to a node of the output terminal Q of the flop-flop 34 and the input terminal D of the flip-flop 35. Another input terminal of the OR circuit 43 is connected to a node of the output terminal Q of the flip-flop 36 and the input terminal D of the flip-flop 37.

An initialization signal init is supplied to a set input terminal of the flip-flop 31 and to each of reset input terminals of the flip-flops 32 to 38. A predetermined clock signal ck is supplied to each of clock input terminals of the flip-flops 31 to 38.

Figure 9:
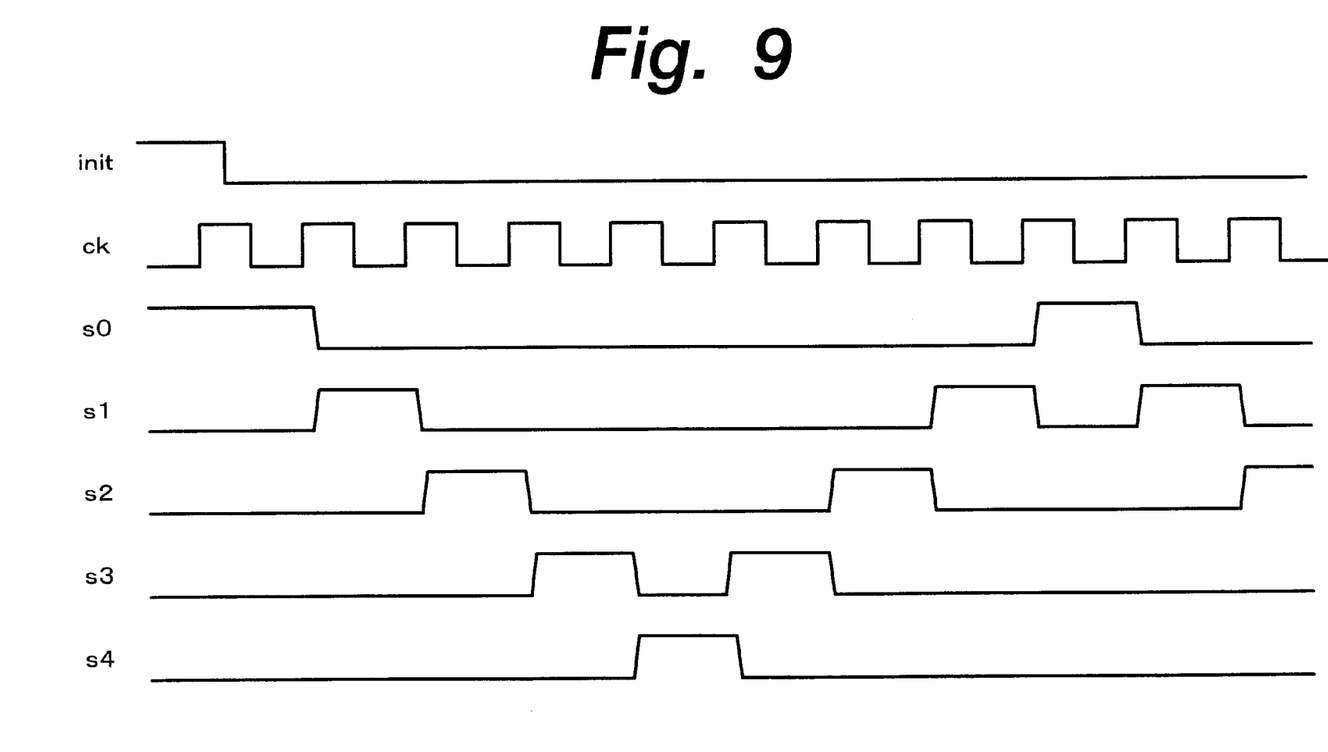
FIG. 9 is a waveform diagram for use in explanation of the dithering control unit in the embodiment of the invention.

FIG. 9 shows examples of the predetermined initialization signal nit, a signal s0 which is obtained from the node of the output terminal Q of the flip-flop 31 and the input terminal D of the flip-flop 32 when the clock signal ck i s supplied, signals s1, s2, and 33 which are obtained from output terminals of the OR circuits 41 to 43, and a signal 34 which is obtained from the node of the output terminal Q of the flip-flop 35 and the input terminal D of the flip-flop 36.

As shown in FIG. 9, the flip-flop 31 is set by the initialization signal lit and each of the flip-flops 32 to 38 is reset. This is because it is necessary to hold only one flip-flop at the high level. The high level is sequentially shifted among the flip-flops one by one at a timing of a leading edge of the clock signal ck and circulated. Therefore, as signals s0 to s4, as shown in FIG. 8,.when one signal is at the high level, the other four signals are set to the low level and the high level is shifted among the signals every cycle of the clock signal ck in order of (signal s0→s1→s2→s3→s4→s3→s2→s1→s2 . . . ). The signals s0 to s4 are used as a control signal SEL1 of the selection processing unit 3 mentioned above. In the foregoing example, the case of controlling the D-type flip-flops 31 to 38 by using the common initialization signal init has been described. However, it is also possible to set all of the outputs to 0 by individually controlling the flip-flops 31 to 38 and stop the synthesizing operation of the clock signal.

Figure 10:
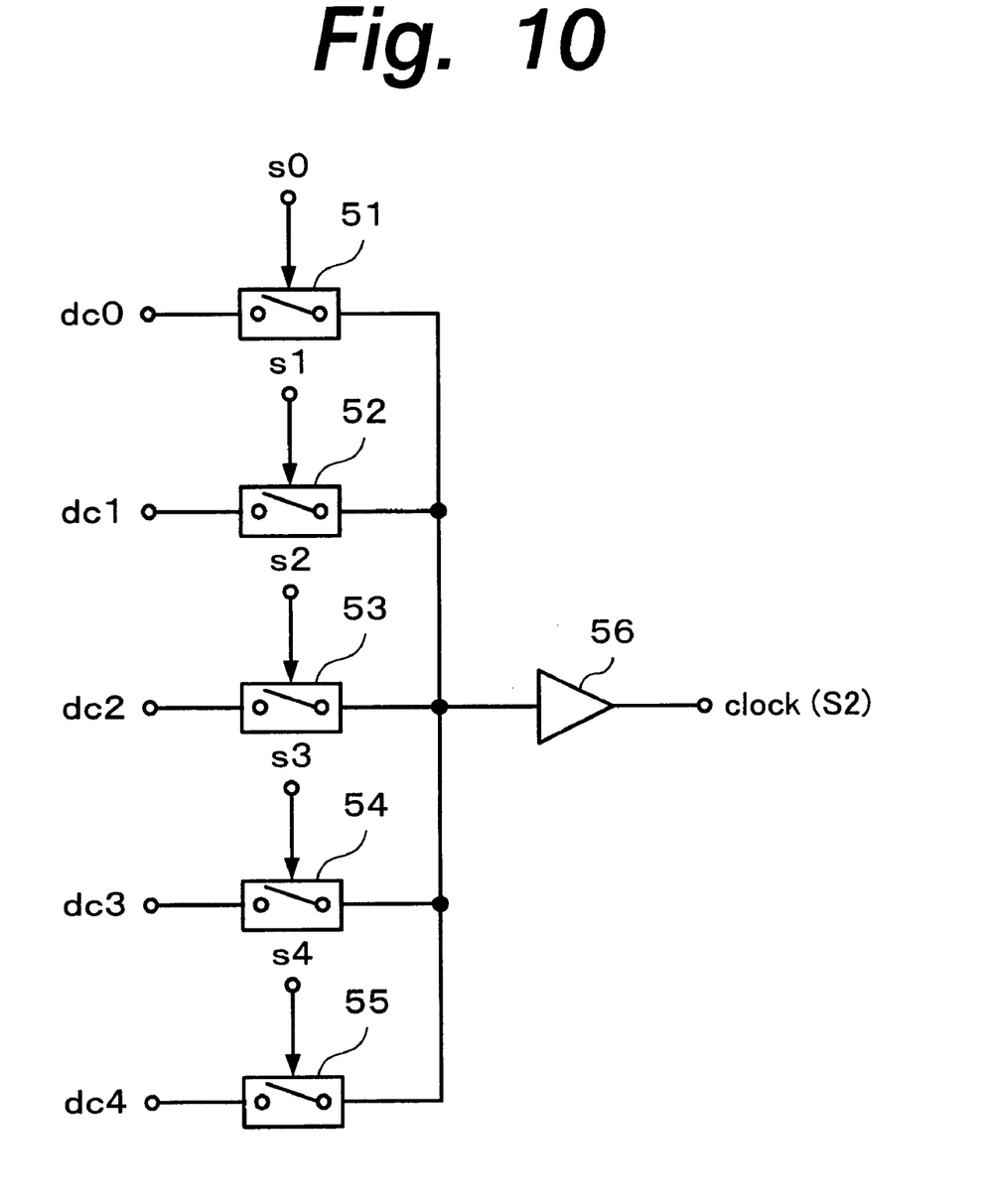
FIG. 10 is a block diagram showing an example of the selection processing unit in the embodiment of the invention.

FIG. 10 shows an example of a specific construction of the selection processing unit 3 mentioned above. As shown in FIG. 10, the selection processing unit 3 is constructed by five switching circuits 51 to 55 provided in correspondence to the signals dc0 to dc4 from the clock forming unit 1 and a buffer 56.

Each of the switching circuits 51 to 55 has a control terminal and is turned on, for example, when the control terminal is controlled to the high level. The signal dc0 is supplied to the input terminal of the switching circuit 51 and the signal s0 is supplied to the control terminal. The signal dc1 is supplied to the input terminal of the switching circuit 52 and the signal s1 is supplied to the control terminal. The signal dc2 is supplied to the input terminal of the switching circuit 53 and the signal s2 is supplied to the control terminal. The signal dc3 is supplied to the input terminal of the switching circuit 54 and the signal s3 is supplied to the control terminal. The signal dc4 is supplied to the input terminal of the switching circuit 55 and the signal s4 is supplied to the control terminal. Output terminals of the switching circuits 51 to 55 are connected in common and an input terminal of the buffer 56 is connected to a common node of them. Therefore, on the output side, the switching circuits 51 to 55 are wired-OR connected and signals transmitted through the switching circuits 51 to 55 are synthesized. The clock signal S2 is taken out from the buffer 56.

Figure 11:
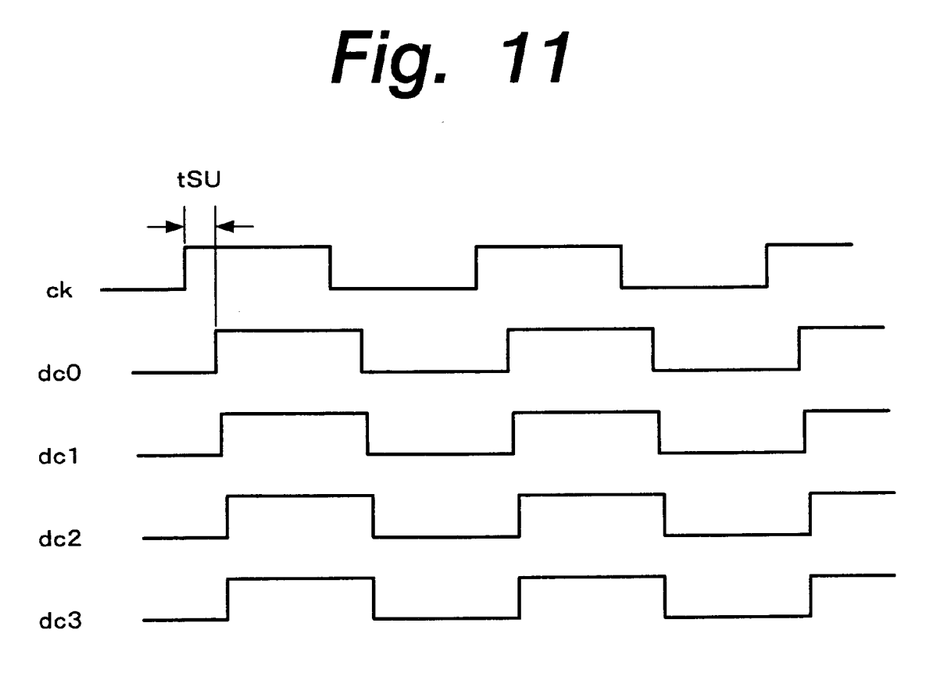
FIG. 11 is a waveform diagram for use in explanation of the dithering control unit and selection processing unit in the embodiment of the invention.

The clock signal ck which is used in the dithering control unit 2 is phase controlled so that a time that is equal to or longer than a time tSU necessary for setup of the selection processing unit 3 can be assured with respect to the signals dc0 to dc4 from the clock forming unit 1 as shown in FIG. 11. Therefore, the signals dc0 to dc4 from the clock forming unit 1 can be correctly selected. The clock signal ck is easily formed by extracting the optimum phase portion in the frequency dividing circuit for forming the signals dc0 to dc4 and using it or by shifting one of the signals dc0 to dc4 by an oscillating clock of the ring oscillator.

Although the case of (m=5) has been described for convenience of explanation in the embodiment, the invention can be easily applied to clock signals of a plurality of phases other than (m=5).

In the above embodiment, explanation has been made with respect to the case where as signals s0 to s4, as shown in FIG. 9, when one signal is at the high level, the other four signals are set to the low level and the high level is shifted among the signals every cycle of the clock signal ck in order of (signal s0→s1→s2→s3→s4 s3→s2→s1→s2 . . . ). However, it is also possible to use a pattern which has another periodicity and whose phase is fluctuated forward and backward within a range of a requested precision on the supplying destination side. For example, in the case where (m=7) and the signals are set to s0 to s6 in order from the signal of the advanced phase toward the signal of the delayed phase, the phase can be also shifted in order of (signal s0→s1→s2→s3→s4→s5→s6→s5→s4→s3→s2→s1→s2 . . . ), (signal s0→s2→s4→s6→s4→s2→s0→s2 . . .) or the like.

Figure 12:
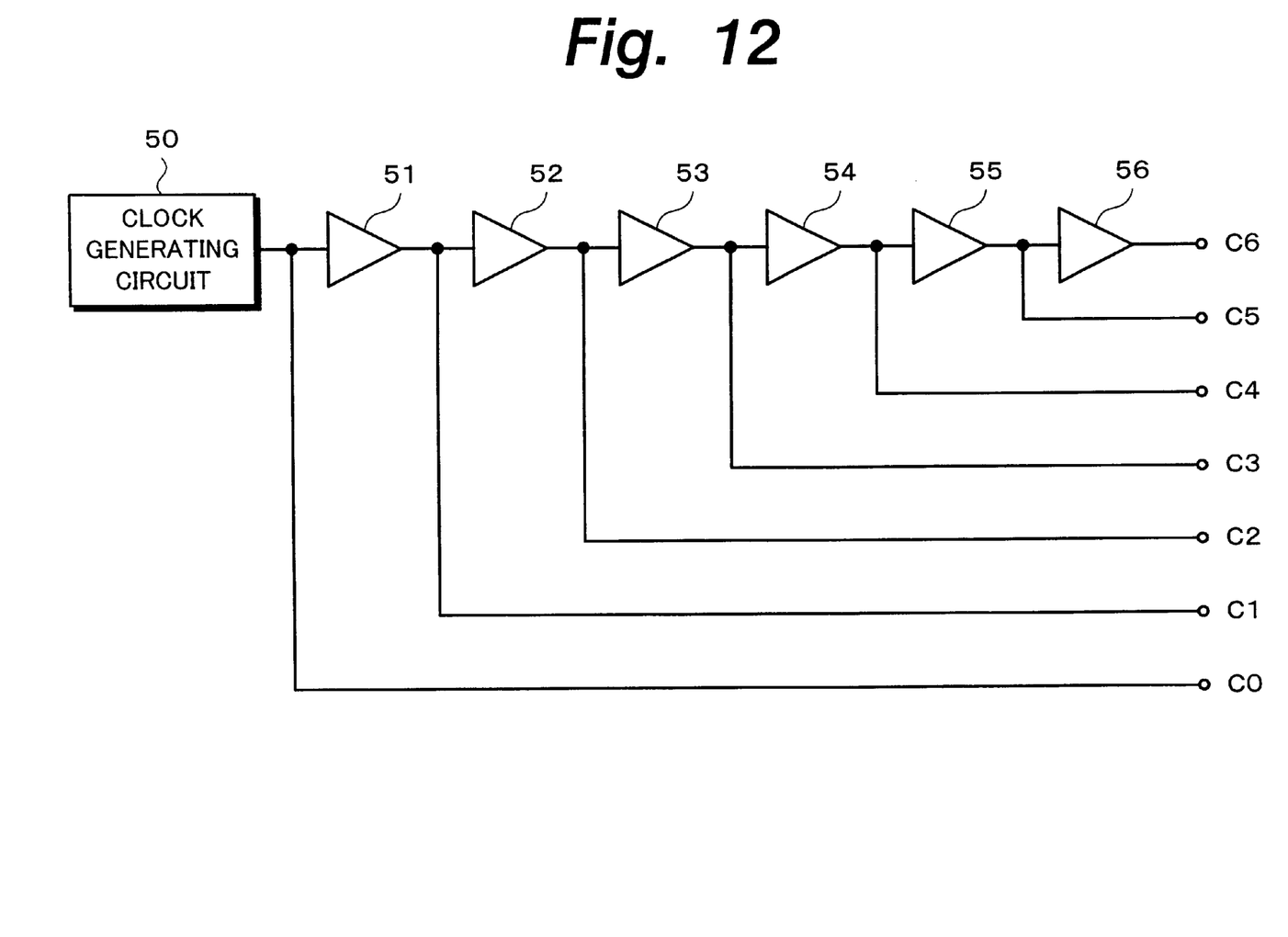
FIG. 12 is a block diagram showing another example of the clock forming unit in the embodiment of the invention.

Further, in the description of the clock forming unit 1 in the above embodiment, the case of using the ring oscillator with the 5-stage construction has been described as a specific example. However, it is also possible to obtain the clock signals of m phases by providing a clock generating circuit and performing a delay process to an output signal thereof. FIG. 12 shows another specific example of the clock forming unit 1. In this case, clock signals of seven phases are formed by setting (m=7).

In FIG. 12, reference numeral 50 denotes a clock generating circuit provided in the clock forming unit 1 or provided outside. Six delay elements 51 to 56 which are serially connected are connected to an output terminal of the clock generating circuit 50. The signal c0 is obtained from the output terminal of the clock generating circuit 50. The signal c1 is obtained from an output terminal of the delay element 51. The signal c2 is obtained from an output terminal of the delay element 52. The signal c3 is obtained from an output terminal of the delay element 53. The signal c4 is obtained from an output terminal of the delay element 54. The signal c5 is obtained from an output terminal of the delay element 55. The signal c6 is obtained from an output terminal of the delay element 56. A delay amount can be arbitrarily set to each of the delay elements 51 to 56. 7-phase clock signals c0 to c6 having different phases can be obtained. In this case, the phase can be shifted to 100 psec or shorter and it is also possible to use a matched delay element using a control voltage of a voltage controlled oscillator of the PLL circuit separately provided in the clock forming unit 1. Further, it is also possible that a reference signal of a frequency that is further higher than an oscillating frequency of an output signal of the clock generating circuit 50 is obtained from another circuit and shift registers are used in place of the delay elements 51 to 56 and allowed to function in a manner similar to the delay elements.

According to the invention, the clock forming means, selecting means, and control means are provided, and the second clock signal in which the phase is fluctuated forward and backward with a predetermined relation within the range of the precision that is permitted by the parallel communication system serving as a supplying destination and the peak on the spectrum is spread is outputted from the selecting means. According to the invention, therefore, the spread spectrum clock synchronized within a predetermined phase difference can be formed by a simple construction, and the electromagnetic noises can be reduced. According to the invention, the second clock signal is outputted from the selecting means and the clock signal having a predetermined high precision formed in the clock forming means is also outputted, so that the invention can be used for the chip which performs both serial and-parallel communication.

The present invention is not limited to the foregoing embodiment but many modifications and variations are possible within the spirit and scope of the appended claims of the invention.

What is claimed is:

1. A clock generating apparatus in a communication system for performing data communication between electronic equipment connected by a bus, comprising:

clock forming means for forming clock signals of m phases mutually having a phase difference;

selecting means for sequentially selecting one of said clock signals of the m phases which are supplied from said clock forming means and outputting it as a second clock signal; and control means for supplying a control signal to said selecting means and controlling so that a spectrum of said second clock signal obtained from said selecting means is spread, wherein said control means controls so as to alternately repeat a period at which a phase of said second clock signal is advanced from a predetermined reference and a period at which it is delayed.

2. An apparatus according to claim 1, wherein m is a number having a value of at least 2.

3. An apparatus according to claim 1, wherein said clock forming means includes a multistage ring oscillator.

4. An apparatus according to claim 1, wherein said clock forming means forms said clock signals of the m phases by sequentially shifting said one clock signal by delay elements.

5. An apparatus according to claim 1, wherein said clock forming means forms said clock signals of the m phases by sequentially shifting said one clock signal by shift registers.

6. An apparatus according to claim 1, wherein said selecting means is constructed by a wired OR.

7. A clock generating apparatus in a communication system for performing data communication between electronic equipment connected by a bus, comprising:

clock forming means for forming clock signals of m phases mutually having a phase difference;

selecting means for sequentially selecting one of said clock signals of the m phases which are supplied from said clock forming means and outputting it as a second clock signal; and control means for supplying a control signal to said selecting means and controlling so that a spectrum of said second clock signal obtained from said selecting means is spread, wherein said control means connects shift registers in a ring-shape and logically decodes outputs of said shift registers, thereby forming said control signal.

8. An apparatus according to claim 7, wherein said clock forming means includes a multistage ring oscillator.

9. An apparatus according to claim 7, wherein m is a number having a value of at least 2.

10. An apparatus according to claim 7, wherein said clock forming means forms said clock signals of the m phases by sequentially shifting said one clock signal by delay elements.

11. An apparatus according to claim 7, wherein said clock forming means forms said clock signals of the m phases by sequentially shifting said one clock signal by shift registers.

12. An apparatus according to claim 7, wherein said selecting means is constructed by a wired OR.

13. A clock generating apparatus in a communication system comprising:

a clock forming unit, said clock forming unit generating a plurality of clock signals, the first clock signal of plurality of clock signals being clock signal$_0$ and the last clock signal of plurality of clock signals being clock signal$_{m-1}$, "m" being the number of clock signals of said plurality of clock signals, said number of clock signals being at least 2;

a selection processing unit, said selection processing unit selecting a system clock signal from said plurality of clock signals; and a dithering control unit, said dithering control unit controlling the selection of said system clock signal from said plurality of clock signals, said system clock signal being sequentially selected from said clock signal$_0$ to clock signal$_{m-2}$ then from said clock signal$_{m-1}$ to clock signal$_1$.

14. An apparatus according to claim 13, wherein said clock forming unit provides said plurality of clock signals to said selection processing unit.

15. An apparatus according to claim 13, wherein said clock forming unit comprises:

a plurality of delay circuits, each delay circuit of said plurality of delay circuits delaying said clock signal by said delay time.

16. An apparatus according to claim 15, wherein said each delay circuit is connected in series.

17. An apparatus according to claim 13, wherein one clock signal of said plurality of clock signals is delayed from another clock signal of said plurality of clock signals by a delay time.

18. An apparatus according to claim 17, wherein said one clock signal is shifted in phase from said another clock signal by said delay time.

19. An apparatus according to claim 13, wherein said plurality of clock signals is supplied to said selection processing unit.

20. An apparatus according to claim 13, wherein said selection processing unit outputs said system clock signal to a communication system.

21. An apparatus according to claim 20, wherein said system clock signal is a spread spectrum system clock.

22. An apparatus according to claim 13, wherein said dithering control unit controls the selection of said system clock signal by controlling the sequential selection of one clock signal from said plurality of clock signals.

* * * * *